United States Patent
Kawai et al.

(10) Patent No.: US 10,337,660 B2
(45) Date of Patent: Jul. 2, 2019

(54) COATED METAL PIPE FOR VEHICLE PIPING

(71) Applicant: Sanoh Industrial Co., Ltd., Shibuya-ku, Tokyo (JP)

(72) Inventors: Naoki Kawai, Koga (JP); Takanori Kon, Koga (JP); Norinobu Kusunoki, Koga (JP); Akira Sugitani, Koga (JP)

(73) Assignee: SANOH INDUSTRIAL CO., LTD., Shibuya-Ku, Tokyo (JP)

( * ) Notice: Subject to any disclaimer, the term of this patent is extended or adjusted under 35 U.S.C. 154(b) by 78 days.

(21) Appl. No.: 15/525,721

(22) PCT Filed: Oct. 13, 2015

(86) PCT No.: PCT/JP2015/078902
§ 371 (c)(1),
(2) Date: May 10, 2017

(87) PCT Pub. No.: WO2016/076050
PCT Pub. Date: May 19, 2016

(65) Prior Publication Data
US 2018/0119871 A1    May 3, 2018

(30) Foreign Application Priority Data
Nov. 10, 2014 (JP) ................. 2014-228118

(51) Int. Cl.
*F16L 58/00* (2006.01)
*F16L 58/10* (2006.01)
(Continued)

(52) U.S. Cl.
CPC ............ *F16L 58/1072* (2013.01); *B32B 1/08* (2013.01); *B32B 15/08* (2013.01); *B32B 15/088* (2013.01);
(Continued)

(58) Field of Classification Search
CPC ................. F16L 58/109; F16L 9/147
(Continued)

(56) References Cited

U.S. PATENT DOCUMENTS

| 4,448,748 A | 5/1984 | Radtke et al. |
| 5,853,806 A | 12/1998 | Higuchi et al. |

(Continued)

FOREIGN PATENT DOCUMENTS

| CN | 193149 A | 3/2007 |
| CN | 1924094 A | 3/2007 |

(Continued)

OTHER PUBLICATIONS

International Search Report and Written Opinion for PCT App No. PCT/JP2015/078902 dated Jan. 19, 2016, 17 pgs.
(Continued)

*Primary Examiner* — Patrick F Brinson
(74) *Attorney, Agent, or Firm* — Procopio, Cory, Hargreaves & Savitch LLP

(57) ABSTRACT

Disclosed is a coated metal pipe including a metal pipe and a multi-layered coating film that covers an outer circumferential surface of the metal pipe. The multi-layered coating film includes a chemical conversion layer and a primer layer, and these layers are provided in this order from the inside. The primer layer contains polyamide imide and at least one kind of additive component selected from polyamide, a fluorine resin, a silane coupling agent, and an epoxy resin.

3 Claims, 2 Drawing Sheets

(51) Int. Cl.
  *B32B 15/08*    (2006.01)
  *B32B 15/088*   (2006.01)
  *B32B 1/08*     (2006.01)
  *C09D 5/00*     (2006.01)
  *C09D 161/04*   (2006.01)
  *C09D 167/00*   (2006.01)
  *C09D 201/00*   (2006.01)
  *C09D 7/40*     (2018.01)
  *C09D 5/08*     (2006.01)
  *C09D 179/08*   (2006.01)
  *C23F 11/173*   (2006.01)
  *F16L 9/02*     (2006.01)
  *C08L 79/08*    (2006.01)

(52) U.S. Cl.
  CPC .............. *C08L 79/08* (2013.01); *C09D 5/00* (2013.01); *C09D 5/08* (2013.01); *C09D 7/40* (2018.01); *C09D 161/04* (2013.01); *C09D 167/00* (2013.01); *C09D 179/08* (2013.01); *C09D 201/00* (2013.01); *C23F 11/173* (2013.01); *F16L 9/02* (2013.01)

(58) Field of Classification Search
  USPC ....... 138/135, 136, 137, 140, 141; 428/34.1, 428/624, 658, 659
  See application file for complete search history.

(56) References Cited

U.S. PATENT DOCUMENTS

| | | | |
|---|---|---|---|
| 5,922,468 A * | 7/1999 | Huesnnann | B05D 5/083 428/421 |
| 7,434,599 B2 | 10/2008 | Sasai | |
| 7,739,980 B2 | 6/2010 | Kim et al. | |
| 8,999,517 B2 * | 4/2015 | Tamura | B32B 1/08 428/626 |
| 2003/0064241 A1 | 4/2003 | Suzuki et al. | |
| 2005/0229992 A1 | 10/2005 | McKeen et al. | |
| 2007/0050967 A1 | 3/2007 | Kim et al. | |
| 2007/0054061 A1 | 3/2007 | Kim et al. | |
| 2009/0038704 A1 | 2/2009 | Sausner et al. | |
| 2010/0247947 A1 | 9/2010 | Tamura et al. | |
| 2010/0247974 A1 | 9/2010 | Kimura et al. | |
| 2010/0260953 A1 * | 10/2010 | Tadaki | B32B 15/08 428/35.7 |
| 2013/0153077 A1 | 6/2013 | Kon et al. | |

FOREIGN PATENT DOCUMENTS

| | | |
|---|---|---|
| CN | 101868564 A | 10/2010 |
| CN | 102030987 A | 4/2011 |
| CN | 102399492 A | 4/2012 |
| EP | 1760167 A2 | 3/2007 |
| EP | 2581467 A1 | 4/2013 |
| JP | H1-99707 | 4/1989 |
| JP | H2-133558 | 5/1990 |
| JP | H8-283925 | 10/1996 |
| JP | 2002-097408 A | 4/2002 |
| JP | 2003-021456 A | 1/2003 |
| JP | 2003-055750 A | 2/2003 |
| JP | 2003-166078 A | 6/2003 |
| JP | 2003-277982 A | 10/2003 |
| JP | 2004-144995 A | 5/2004 |
| JP | 2005-335183 A | 12/2005 |
| JP | 2006-037207 A | 2/2006 |
| JP | 2006-249459 A | 9/2006 |
| JP | 2006-328445 A | 12/2006 |
| JP | 2007-070729 A | 3/2007 |
| JP | 2009-001623 A | 1/2009 |
| JP | 2009-001723 A | 1/2009 |
| JP | 2009-024211 A | 2/2009 |
| JP | 2009-179848 A | 8/2009 |
| JP | 2009-209394 A | 9/2009 |
| JP | 2009-275287 A | 11/2009 |
| JP | 2010-084198 A | 4/2010 |
| JP | 2012-062519 A | 3/2012 |
| JP | 5225662 B2 | 7/2013 |
| JP | 2014-144995 A | 8/2014 |
| JP | 2014-173123 A | 9/2014 |
| JP | 5770177 B2 | 8/2015 |
| JP | 2016-088027 A | 5/2016 |
| RU | 2012157058 A | 7/2014 |
| WO | 2008/155611 A1 | 12/2008 |
| WO | 2009001182 A1 | 12/2008 |

OTHER PUBLICATIONS

Office Action for related Russian Patent Application No. 2017119445, dated Apr. 5, 2018.
International Preliminary Report on Patentability for PCT App No. PCT/JP2015/078902 dated May 26, 2017, 9 pgs.
Office Action for CN App No. 201580060320.9 dated Jun. 15, 2018, 7 pgs.
Extended European Search Report for EP App No. 15858737.8 dated May 17, 2018, 7 pgs.

* cited by examiner

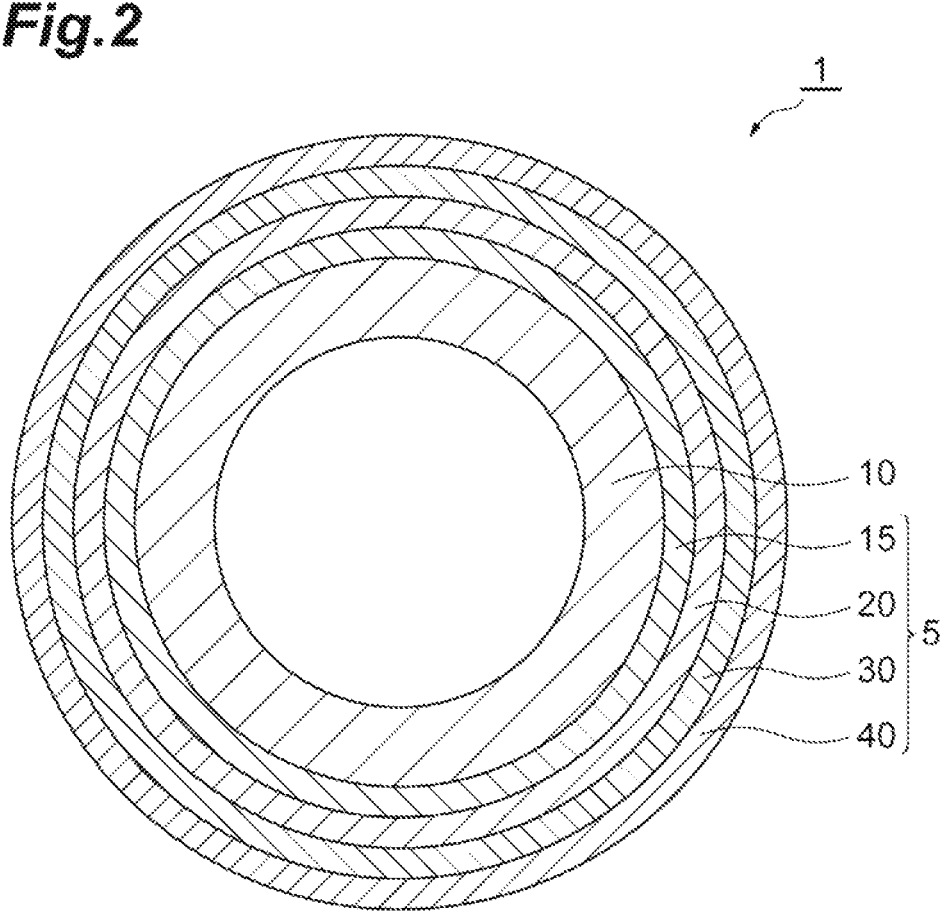

COATED METAL PIPE FOR VEHICLE PIPING

The present application is a National Stage entry of PCT/JP2015/078902, filed on Oct. 13, 2015, and claims priority to Japanese Patent Application No. 2014-228118, filed on Nov. 10, 2014, the contents of which are incorporated by reference in their entirety.

TECHNICAL FIELD

The present invention relates to a coated metal pipe for vehicle piping. In addition, the present invention relates to a method for producing a coated metal pipe for vehicle piping and a primer composition used for forming a primer layer of a coated metal pipe for vehicle piping.

BACKGROUND ART

An outer circumferential surface of a metal pipe used as fuel piping or the like for a vehicle is generally protected by various coating films in order to secure corrosion resistance, chemical resistance, and the like (for example, Patent Literatures 1 to 4).

CITATION LIST

Patent Literature

Patent Literature Japanese Patent No. 5225662
Patent Literature 2: Japanese Unexamined Patent Publication No. 2003-21456
Patent Literature 3: Japanese Unexamined Patent Publication No. 2003-277982
Patent Literature 4: Japanese Unexamined Patent Publication No. 2004-144995

SUMMARY OF INVENTION

Technical Problem

However, a conventional coated metal pipe having a coating film has a problem in that, when the coating film is damaged during using the coated metal pipe as piping, corrosion resistance of the damaged portion is significantly decreased. In particular, since a coated metal pipe for vehicle piping has high possibility that a coating film thereof is damaged, corrosion resistance in the damaged portion of the coating film is very important.

In this regard, a main object of the present invention is to improve corrosion resistance when a coating film is damaged, regarding a coated metal pipe which is used for vehicle piping and includes a multi-layered coating film that covers a metal pipe.

Solution to Problem

The present invention relates to a coated metal pipe for vehicle piping including a metal pipe and a multi-layered coating film that covers an outer circumferential surface of the metal pipe. In the coated metal pipe, the multi-layered coating film includes a chemical conversion layer and a primer layer, and these layers are provided in this order from the inside. The primer layer may contain a polyamide imide and at least one kind of additive component selected from a 2.0 polyamide, a fluorine resin, a silane coupling agent, and an epoxy resin.

Based on the findings of the present inventors, in the multi-layered coating film including a combination of a chemical conversion layer and a primer layer, when the primer layer contains the polyamide imide and the specific additive component, corrosion resistance is significantly improved when the coating film is damaged.

According to another aspect, the present invention relates to a primer composition for vehicle piping, containing: a polyamide imide; at least one kind of additive component selected from a polyamide, a fluorine resin, a silane coupling agent, and an epoxy resin; and a solvent that dissolves the polyamide imide and the at least one kind of additive component. A ratio of a phenolic resin in the primer composition may be 0% by mass or more and less than 11% by mass based on the total mass of components of the primer composition other than the solvent. A ratio of polyester in the primer composition may be 0% by mass or more and less than 11% by mass based on the total mass of components of the primer composition other than the solvent.

According to still another aspect, the present invention relates to a method for producing a coated metal pipe, including a step of forming, on an outer circumferential surface of a metal pipe, a multi-layered coating film that covers the outer circumferential surface. In this method, the step of forming the multi-layered coating film may include forming a tubular chemical conversion layer on the outer circumferential surface side of the metal pipe, and forming a film, of the primer composition on an outer circumferential surface of the chemical conversion layer and then removing the solvent from the film of the primer composition to form a primer layer containing the polyamide imide and the additive component.

Advantageous Effects of Invention

According to the present invention, it is possible to improve corrosion resistance when a coating film is damaged, regarding a coated metal pipe which is used for vehicle piping and includes a multi-layered coating film that covers a metal pipe. In addition, the coated metal pipe according to the present invention is also excellent in adhesiveness between layers constituting the multi-layered coating film.

BRIEF DESCRIPTION OF DRAWINGS

FIG. 2 is a cross-sectional view illustrating an embodiment of a coated metal pipe.

DESCRIPTION OF EMBODIMENTS

Figure 1:
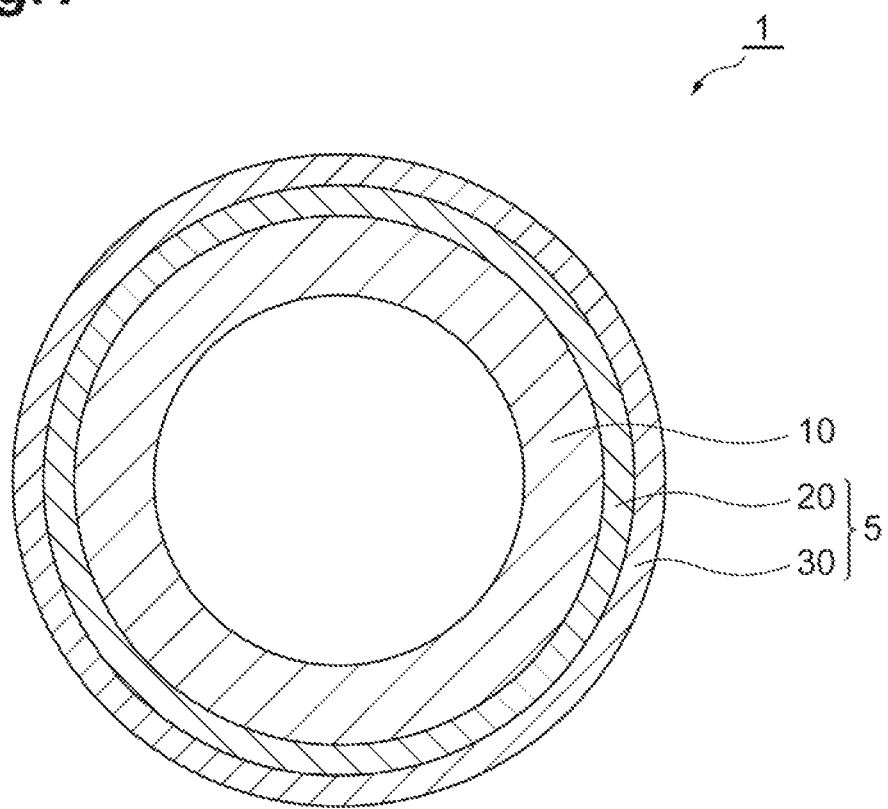
FIG. 1 is a cross-sectional view illustrating an embodiment f a coated metal pipe.

Hereinafter, embodiments of the present invention will be described in detail. However, the present invention is not limited to the following embodiments.

FIG. 1 is a cross-sectional view illustrating a coated metal pipe according to an embodiment. FIG. 1 illustrates the cross-section perpendicular to the longitudinal direction of the coated metal pipe. A coated metal pipe 1 illustrated in FIG. 1 includes a metal pipe 10 and a multi-layered coating film 5 that covers an outer circumferential surface of the metal pipe 10. The multi-layered coating film 5 includes a chemical conversion layer 20 and a primer layer 30, and these layers are provided in this order from the inside (the metal pipe 10 side). The multi-layered coating film 5 may cover the entire outer circumferential surface of the metal pipe 10 or the multi-layered coating film 5 may not be provided at a portion in which the coating film is not necessary.

The metal pipe 10 is not particularly limited as long as it is a tubular metal molded body, but for example, the metal pipe may be a steel pipe or a metal alloy pipe other than the steel pipe. The steel pipe may be a single-wall steel pipe formed by rolling up a steel sheet in a tubular shape or a double-wall steel pipe formed by rolling up a steel sheet, the surface of which has been subjected to plating (copper plating or the like), twice in a tubular shape.

The outer diameter of the metal pipe 10 is not particularly limited, but may be, for example, 4 to 42 mm. The thickness of the metal pipe 10 may be, for example, 0.35 to 2.0 mm.

The chemical conversion layer 20 is a layer formed by substituting the outer circumferential surface of the metal pipe to surface treatment with a chemical conversion treatment solution, and may contain a metal atom selected from titanium, zirconium, molybdenum, tungsten, vanadium, manganese, nickel, cobalt, chromium, lead, and the like. A part or whole of these metal atoms may be contained as a compound such as an oxide in the chemical conversion layer 20. The chemical conversion layer 20 may be a non-chromate chemical conversion layer substantially not containing trivalent chromium.

The chemical conversion layer 20 may contain at least one type of resin selected from a polyurethane, an acrylic resin, a polyolefin, and an epoxy resin, instead of or in addition to the metal atom. These resins may be an aqueous resin which can be dissolved or dispersed in water.

The ratio of the metal atom in the chemical conversion layer 20 may be, for example, 0.1 to 50% by mass based on the mass of the chemical conversion layer 20. The ratio of the resin in the chemical conversion layer 20 may be, for example, 0.1 to 99.9% by mass based on the mass of the chemical conversion layer 20.

The chemical conversion layer 20 may further contain other components such as a silane coupling agent. Examples of other components which may be contained in the chemical conversion layer 20 include polyimide-based silane.

The chemical conversion layer 20 can be formed by a method in which the outer circumferential surface of the metal pipe 10 or the surface of a plated layer to be described below is treated with a chemical conversion treatment solution. The chemical conversion treatment solution may contain a metal compound containing the above-described metal atoms (such as fluoride, phosphate, nitrate, or sulfate), at least one kind of resin selected from a polyurethane, an acrylic resin, a polyolefin, and an epoxy resin, and water that dissolves or disperses these components.

A multi-layered coating film with particularly excellent corrosion resistance can be formed by using the chemical conversion treatment solution containing the metal compound and the resin. From the same viewpoint, the pH of the chemical conversion treatment solution may be 5 to 8.

The attached amount of the chemical conversion layer 20 is not particularly limited, but may be, for example, 1 to 300 mg/m$^2$.

The chemical conversion layer 20 can be formed, for example, by a method including: forming a film of the chemical conversion treatment solution containing water on the outer circumferential surface of the metal pipe 10; and removing water from the film of the chemical conversion treatment solution. The formation of the film of the chemical conversion treatment solution can be performed by an arbitrary method such as immersing or spraying. Water in the film of the chemical conversion treatment solution is removed by heating the film as necessary. The heating method is not particularly limited, but methods such as hot air heating, infrared heating, and high frequency heating may be selected.

The primer layer 30 contains a polyamide imide and at least one kind of additive component selected from a polyamide, a fluorine resin, a silane coupling agent, and an epoxy resin. As the additive component, a polyamide, a fluorine resin, or a combination thereof may be selected. When the polyamide and the fluorine resin are used, further excellent corrosion resistance can be achieved.

The polyamide imide is a polymer containing a constituent unit having an amide group and an imide group. The constituent unit having an amide group and an imide group is represented, for example, by the following formula. In the formula, R represents a divalent organic group, and a plurality of Rs in the same molecule may be the same as or different from one another.

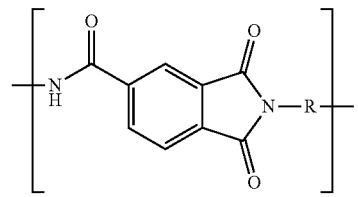

The polyamide, which is used in combination with the polyamide imide, may be a polymer containing a constituent unit having an amide group (not having an imide group). For example, the polyamide may be selected from polyamide 6, polyamide 66, polyamide 11, polyamide 12, polyamide 612, polyamide 1010, and polyamide 1012. The polyamide may be dissolved with the polyamide imide to form a single phase containing the polyamide imide and the polyamide or to form a microphase-separated structure having a phase containing the polyamide imide and a phase containing the polyamide.

The fluorine resin is a polymer composed of a constituent unit having a fluorine atom, and typically is a polyolefin containing a monomer unit derived from a fluorine-substituted olefin. The fluorine resin may be selected, for example, from poly(vinyl fluoride) (PVF), poly(vinylidene fluoride) (PVdF), and polytetrafluoroethylene (PTFE). As the fluorine resin, particularly, poly(vinyl fluoride), poly(vinylidene fluoride), or a combination thereof may be used.

The slime coupling agent is a compound having an alkoxysilyl group and a reactive functional group other than the alkoxysilyl group, and can be appropriately selected from compounds known as the silane coupling agent.

The epoxy resin is a compound having one or two or more epoxy groups. The epoxy resin may be selected, for example, from bisphenol A type epoxy resins. When the primer layer contains the epoxy resin, generally, at least a part of the epoxy resin forms a cross-linked structure.

The ratio of the polyamide imide in the primer layer may be 10% by mass or more, 20% by mass or more, or 30% by mass or more, and may be 90% by mass or less, 70% by mass or less, or 50% by mass or less, based on the mass of the primer layer. The ratio of the additive component may be 1% by mass or more, 10% by mass or more, or 15% by mass or more, and may be 50% by mass or less, 30% by mass or less, or 15% by mass or less, based on the mass of the primer layer. When each component is within these numerical ranges, particularly significant effects in terms of corrosion resistance improvement and the like can be easily obtained. The upper and lower limit numerical values can be arbitrary combined to specify the numerical ranges. The same applies to descriptions related to other numerical values in the present specification.

The primer layer may not substantially contain a cross-linkable component (a phenolic resin or the like) which may form a cross-linked polymer by cross-linking reaction. For example, the ratio of the phenolic resin in the primer layer may be 0% by mass or more and less than 11% by mass, or 0% by mass or more and less than 1% by mass based on the mass of the primer layer. When the primer layer does not substantially contain the phenolic resin, or contains the phenolic resin at a ratio of less than 11% by mass, corrosion resistance when the coating film is damaged may be further improved.

The ratio of the polyester in the primer layer may be 0% by mass or more and less than 11% by mass based on the mass of the primer layer. When the primer layer does not substantially contain the polyester, or contains the polyester at a ratio of less than 11% by mass, corrosion resistance when the coating film is damaged may be further improved.

The thickness of the primer layer 30 is not particularly limited, but for example, may be 0.5 to 20 μm or 1 to 10 μm.

The primer layer 30 may further contain other component as necessary in addition to the above components.

The primer layer 30 can be formed, for example, by a method including: forming a film of the primer composition containing a solvent on the outer circumferential surface of the metal pipe 10 and then removing the solvent from the film of the primer composition. The formation of the film of the primer composition can be performed by an arbitrary method such as immersing or coating. Water in the film of the primer composition is removed by heating the film as necessary. The heating method is not particularly limited, but methods such as hot air heating, infrared heating, and high frequency heating may be selected.

The primer composition may contain the polyamide imide, the aforementioned additive component, a solvent that dissolves or disperses these components, and other components that are added as necessary.

The ratio of the polyamide imide in the primer composition may be 10% by mass or more, 20% by mass or more, or 30% by mass or more based on the total mass of components other than the solvent in the primer composition, and may be 90% by mass or less, 70% by mass or less, or 50% by mass or less. When each component is within these numerical ranges, particularly significant effects in terms of corrosion resistance improvement and the like can be easily obtained. In general, the ratio of each component other than the solvent in the primer composition is substantially identical to the ratio of each component in the primer layer.

The solvent used in the primer composition is selected, for example, from γ-butyrolactone and N-methylpyrrolidone. The total ratio (concentration) of components other than the solvent in the primer composition may be 5% by mass or less based on the total mass of the primer composition. When the concentration of the components other than the solvent is too high, aggregation of the resin tends to easily occur.

FIG. 2 is also a cross-sectional view illustrating a coated metal pipe according to an embodiment. The multi-layered coating film 5 of the coated metal pipe 1 illustrated in FIG. 2 further includes a plated layer 15 that is provided between the metal pipe 10 and the chemical conversion layer 20 and a resin layer 40 that covers the outer circumferential surface of the primer layer 30, in addition to the same metal pipe 10, chemical conversion layer 20, and primer layer 30 as in the coated metal pipe of FIG. 1.

The plated layer 15 is not particularly limited, but for example, is metal plating formed by wet plating such as electroplating or electroless plating or dry plating such as hot dipping. As the wet plating, for example, electrogalvanizing or electroless nickel plating is suitable. As the dry plating, for example, hot dipping zinc coating, hot dipping aluminum coating, hot dipping zinc-aluminum alloy coating, and hot dipping Sn alloy coating are suitable. A metal constituting the plated layer 15 may be one kind or two or more kinds. The plated layer 15 may be, for example, a hot-dipped layer containing aluminum, magnesium, and zinc.

The thickness of the plated layer 15 is not particularly limited, but for example, may be 1 to 100 μm or 10 to 30 μm.

The resin layer 40 is a layer containing a thermosetting resin, a thermoplastic resin, or a combination thereof as main components. The thermosetting resin is generally contained as a cured product thereof in the resin layer 40. The resin layer 40 may contain, for example, a polyamide or a fluorine resin. When the resin layer 40 containing the polyamide or the fluorine resin and the primer layer according to this embodiment are combined, particularly excellent adhesiveness and corrosion resistance can be achieved. The polyamide and the fluorine resin can be selected from examples mentioned as the components of the primer composition.

The thickness of the resin layer 40 is not particularly limited, but for example, may be 20 to 200 μm.

The resin layer 40 can be formed, for example, by a method of forming, on the primer layer 30, a film of a liquid composition (coating material) containing a resin such as a thermoplastic resin and a solvent that dissolves or disperses the resin and removing the solvent from the liquid composition on the primer layer 30.

The present invention is not limited to the above-described embodiments, but can be appropriately changed in a range not departing from the gist of the present invention. For example, the coated metal pipe may further have other layer(s) like a top coat layer that covers the outer circumferential surface of the resin layer 40. The top coat layer may contain a thermoplastic resin selected from polypropylene, polyethylene, and the like.

EXAMPLES

Hereinafter, the present invention will be described in more detail by means of Examples. However, the present invention is not limited to these Examples.

1. Production of Coated Metal Pipe

Example 1

A coated metal pipe composed of a metal pipe (steel pipe), a plated layer, a chemical conversion layer, a primer layer, and a resin layer was produced according to the following procedures.

A double-wall steel pipe (thickness: 0.7 mm) obtained by rolling up a steel sheet twice in a tubular shape was prepared. A plated layer containing zinc and aluminum was formed on the outer circumferential surface of the steel pipe by hot dipping. The amount of the plated layer was about 45 g/m². An aqueous treatment solution containing an aqueous polyurethane, titanium, and zirconium was applied onto the plated layer and the treatment solution on the plated layer was dried by heating to form a chemical conversion layer (attached amount: 200 mg/m²).

A primer liquid (primer composition) containing a polyamide imide, a polyamide, and γ-butyrolactone as a solvent and not containing a phenolic resin was prepared. The ratio of the polyamide imide in the primer liquid was set to 89% by mass based on the total mass of the polyamide imide and the polyamide. The ratio of the polyamide was 11% by mass based on the total mass of the polyamide imide and the polyamide. The primer liquid was applied onto the chemical conversion layer and the primer liquid (a film of the primer composition) on the primer composition was dried by heating to form a primer layer. The thickness of the primer layer was 5 µm.

A coating material containing polyamide (polyamide 11) was applied to the primer layer and the coating material on the primer layer was dried to form a resin film (thickness: 150 µm).

Examples 2 to 7 and Comparative Examples 1 to 5

Coated metal pipes were produced in the same manner as in Example 1, except that a primer liquid having a composition presented in Table 1 was used. In the table, numerical values in parentheses are ratios of respective components based on the total mass of components other than the solvent in the primer liquid.

2. Evaluation

The following evaluations were carried out on the primer liquid and the coated metal pipe. The evaluation results are presented in Table 1.

Condition of Liquids

The condition of the liquids was evaluated based on solubility of each component to the solvent. A case where each component was uniformly dissolved in the solvent was designated as "Good" and a case where there were non-dissolving residues and a uniform primer liquid was not obtained was designated as "Poor."

Adhesion Strength

Cuts were formed with a width of 2 mm on the resin layer of the coated metal pipe. The coated metal pipe was fixed and the belt-like resin layer between the cuts was pulled with a tensile tester to evaluate adhesion strength. The adhesion strength was determined based on the following criteria.

A case where there was no peeling of the PA coating film was designated as "Good" and a case where there was peeling was designated as "Poor."

Corrosion Resistance

A cut with a depth reaching the primer layer from the surface of the resin layer was formed. The length of the cut was set to 120 mm. The coated metal pipe with the cut was immersed in 5% by mass of saline solution set at 80° C. for 144 hours. After immersion, the width (maximum width: 3 mm) of a portion in which the resin layer was peeled off from the cut was measured. Corrosion resistance was determined based on the following criteria.

Good: 1.4 mm or less

Allowable: 1.5 to 1.9 mm

Poor: 2.0 mm or more

TABLE 1

|  |  |  | Condition of Liquid | Adhesion strength | Corrosion resistance |
|---|---|---|---|---|---|
| Ex. 1 | Polyamide imide (89 mass %) | Polyamide (5.5 mass %) | Good | Good | 1.4 |
| Ex. 2 | Polyamide imide (89 mass %) | Polyamide (11 mass %) | Good | Good | 1.4 |
| Ex. 3 | Polyamide imide (89 mass %) | Polyvinyl fluoride (11 mass %) | Good | Good | 1.1 |
| Ex. 4 | Polyamide imide (89 mass %) | Polyvinylidene fluoride (11 mass %) | Good | Good | 1.6 |
| Ex. 5 | Polyamide imide (89 mass %) | Polytetrafluoroethylene (11 mass %) | Good | Good | 1.8 |
| Ex. 6 | Polyamide imide (99 mass %) | Silane coupling agent (1 mass %) | Good | Good | 1.5 |
| Ex. 7 | Polyamide imide (89 mass %) | Epoxy resin (11 mass %) | Good | Allowable | 1.8 |
| Comp. Ex. 1 | Polyamide imide (89 mass %) | Phenolic resin (11 mass %) | Good | Good | 2.1 |
| Comp. Ex. 2 | Polyamide imide (89 mass %) | Phenol-based resin (11 mass %) | Poor | — | — |
| Comp. Ex. 3 | Polyamide imide (89 mass %) | Polyester (11 mass %) | Good | Good | 2.1 |
| Comp. Ex. 4 | Polyamide imide (89 mass %) | Chlorine resin (11 mass %) | Good | Poor | — |

TABLE 1-continued

|  |  |  | Condition of Liquid | Adhesion strength | Corrosion resistance |
|---|---|---|---|---|---|
| Comp. Ex. 5 | Polyamide imide (89 mass %) | Polybutadiene (11 mass %) | Good | Poor | 2.0 |

Details of components presented in Table 1 are described as follows.
Polyamide imide: VYLOMAX HR (trade name, manufactured by TOYOBO CO., LTD.
Polyamide: 2015 (trade name), manufactured by ThreeBond Holdings Co., Ltd.
Polyvinyl fluoride: Tedlar (trade name), manufactured by DuPont
Polyvinylidene fluoride: KYNAR (trade name), manufactured by ARKEMA K.K.
Polytetrafluoroethylene: Teflon (registered trademark, trade name), manufactured by Kashima Bearings, Inc.
Silane coupling agent: A-1120 (trade name), manufactured by Nippon Unicar Co., Ltd.
Epoxy resin: EPICLON 7050 (trade name), manufactured by DIC Corporation
Phenolic resin: PHENOLITE (trade name), manuctured by DIC Corporation
Phenol-based resin: YS POLYSTER UH115 (trade name), manufactured by YASUHARA CHEMICAL CO., LTD.
Polyester: PET Resin (trade name), manufactured by UNITIKA LTD.
Chlorine resin: PVC-HA (trade name), manufactured by SEKISUI CHEMICAL CO., LTD.
Polybutadiene: B-3000 (trade name), manufactured by Nippon Soda Co., Ltd.

As presented in Table 1, according to the primer liquids of Examples 1 to 7 obtained by combining polyamide imide with polyamide, polyvinyl fluoride, polyvinylidene fluoride, polytetrafluoroethylene, a silane coupling agent, or an epoxy resin, obviously improved corrosion resistance was exhibited as compared to Comparative Examples 1 to 5.

INDUSTRIAL APPLICABILITY

The metal pipe according to the present invention can be suitably used as vehicle piping such as brake piping and fuel piping.

REFERENCE SIGNS LIST

1 . . . coated metal pipe, 5 . . . multi-layered coating film, 10 . . . metal pipe, 15 . . . plated layer, 20 . . . chemical conversion layer, 30 . . . primer layer, 40 . . . resin layer.

The invention claimed is:
1. A coated metal pipe for vehicle piping, comprising:
a metal pipe; and
a multi-layered coating film that covers an outer circumferential surface of the metal pipe, wherein
the multi-layered coating film includes a chemical conversion layer and a primer layer, the chemical conversion layer and the primer layer being provided in this order from the inside,
the primer layer contains polyamide imide and at least one kind of additive component selected from polyamide, a fluorine resin, a silane coupling agent, and an epoxy resin,
the ratio of the polyamide imide in the primer layer is 30% by mass or more, based on the mass of the primer layer, and
the ratio of the additive component in the primer layer is 30% by mass or less, based on the mass of the primer layer.
2. The coated metal pipe for vehicle piping according to claim 1, wherein a ratio of a phenolic resin in the primer layer is 0% by mass or more and less than 11% by mass based on the mass of the primer layer.
3. The coated metal pipe for vehicle piping according to claim 1, wherein a ratio of polyester in the primer layer is 0% by mass or more and less than 11% by mass based on the mass of the primer layer.

* * * * *